United States Patent
Nakata

(10) Patent No.: US 7,808,943 B2
(45) Date of Patent: Oct. 5, 2010

(54) MOBILE BODY COMMUNICATION SYSTEM, MOBILE BODY COMMUNICATION METHOD, AND MOBILE BODY COMMUNICATION BASE STATION DEVICE

(75) Inventor: Koji Nakata, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 483 days.

(21) Appl. No.: 10/597,516

(22) PCT Filed: Oct. 22, 2004

(86) PCT No.: PCT/JP2004/015742

§ 371 (c)(1),
(2), (4) Date: Jul. 27, 2006

(87) PCT Pub. No.: WO2005/074206

PCT Pub. Date: Aug. 11, 2005

(65) Prior Publication Data
US 2008/0240088 A1 Oct. 2, 2008

(30) Foreign Application Priority Data
Jan. 30, 2004 (JP) .................. P.2004-024517

(51) Int. Cl.
*H04H 20/71* (2008.01)
(52) U.S. Cl. .......... 370/312; 370/328; 370/338; 370/352; 370/390; 370/392; 455/458; 455/561; 455/518; 455/519; 709/227; 709/228; 709/229; 709/236
(58) Field of Classification Search .......... 370/252, 370/310, 351, 389, 392, 395.52, 401, 312, 370/338, 352–356, 432, 328, 390; 709/200, 709/217, 220, 223–230, 245, 236; 455/404.1, 455/518, 519, 433, 435.1, 435.2, 458, 560, 455/561
See application file for complete search history.

(56) References Cited

U.S. PATENT DOCUMENTS

| 6,222,829 | B1 | 4/2001 | Karlsson et al. |
| 6,490,259 | B1 | 12/2002 | Agrawal et al. |
| 6,542,935 | B1 * | 4/2003 | Ishii ............. 709/245 |
| 6,647,259 | B1 * | 11/2003 | Boyle et al. ......... 455/417 |
| 6,731,621 | B1 | 5/2004 | Mizutani et al. |
| 6,754,224 | B1 * | 6/2004 | Murphy ............. 370/432 |
| 6,763,004 | B1 * | 7/2004 | De Oliveira ......... 370/312 |
| 7,039,028 | B2 * | 5/2006 | Chen et al. .......... 370/331 |
| 7,257,104 | B2 | 8/2007 | Shitama |
| 7,298,716 | B2 * | 11/2007 | Abraham et al. ....... 370/321 |

(Continued)

FOREIGN PATENT DOCUMENTS

EP  0963087 A1  12/1999

(Continued)

*Primary Examiner*—Charles N Appiah
*Assistant Examiner*—Olumide T Ajibade Akonai
(74) *Attorney, Agent, or Firm*—Hogan Lovells US LLP

(57) ABSTRACT

In the IP adapted mobile body communication system, a call receiving procedure according to a paging area providing method is provided, and an existing mobile body communication system and a VoIP-based mobile body communication system can be used at the same time.

The mobile body communication system includes subnet forming means for forming a broadcast domain with at least one base station device (2), and simultaneous call means for transmitting a call signal to the broadcast address of said subnet when calling a mobile station device (1).

6 Claims, 5 Drawing Sheets

U.S. PATENT DOCUMENTS

| | | |
|---|---|---|
| 7,388,855 B2 * | 6/2008 | Madour .................. 370/338 |
| 2002/0126642 A1 | 9/2002 | Shitana |
| 2003/0012179 A1 | 1/2003 | Yano ..................... 370/352 |
| 2003/0091165 A1 * | 5/2003 | Bearden et al. ......... 379/88.08 |
| 2003/0145092 A1 | 7/2003 | Funato et al. |
| 2003/0152038 A1 * | 8/2003 | Oshima et al. ............ 370/252 |
| 2005/0013280 A1 * | 1/2005 | Buddhikot et al. ........ 370/349 |

FOREIGN PATENT DOCUMENTS

| | | |
|---|---|---|
| JP | 2001527337 A | 12/2001 |
| JP | 2004-056336 | 2/2004 |
| JP | 2004-200839 | 7/2004 |
| JP | 2004-248068 | 9/2004 |
| WO | 9933250 A1 | 7/1999 |
| WO | 03065237 A1 | 8/2003 |

* cited by examiner

FIG.5
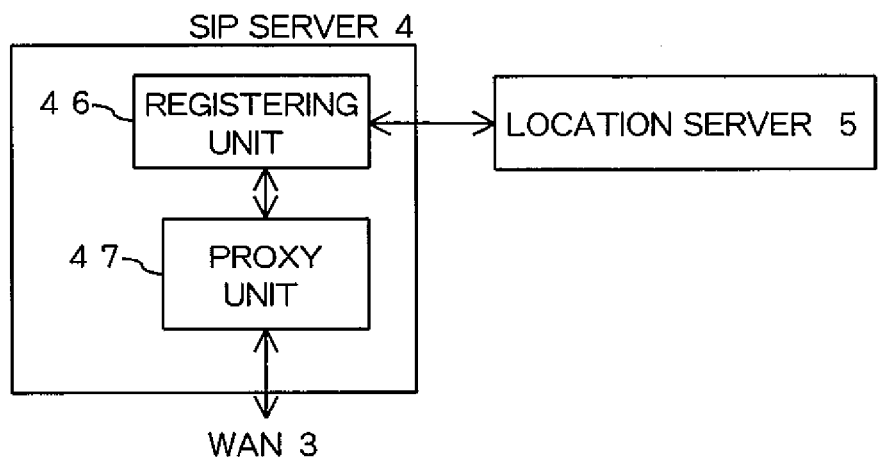
FIG.6
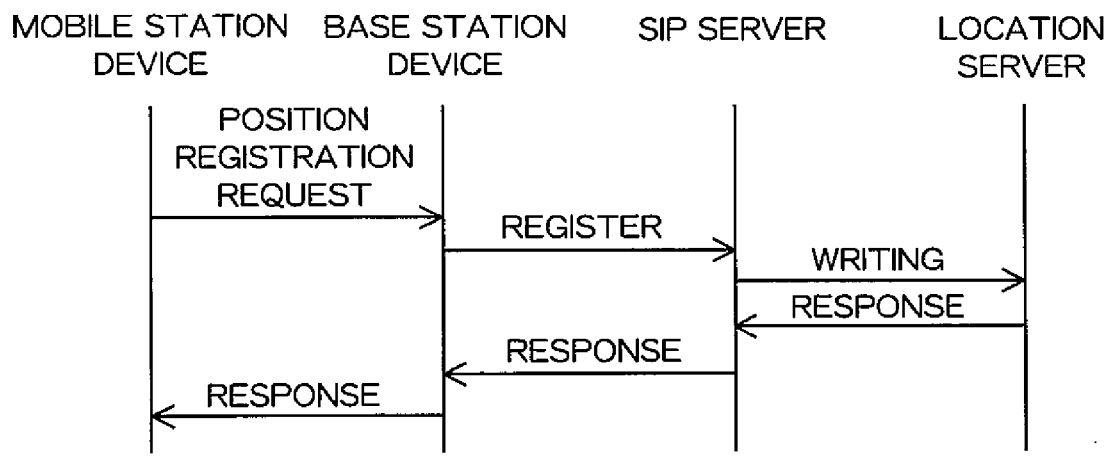
FIG.7
| TELEPHONE NO. | NETWORK ADDRESS OF SUBNETWORK OF BASE STATION DEVICE |
|---|---|
| 07012345678 | 199.2.0.0/24 |
| 07012345679 | 200.2.0.0/24 |
| • | • |
| • | • |
| • | • |

MOBILE BODY COMMUNICATION SYSTEM, MOBILE BODY COMMUNICATION METHOD, AND MOBILE BODY COMMUNICATION BASE STATION DEVICE

TECHNICAL FIELD

The present invention relates to a mobile body communication system and a mobile body communication method, and more particularly to application of IP technology to a mobile body communication system.

BACKGROUND ART

In a mobile body communication system such as PHS (Personal Handyphone System), mobile phone systems, etc., a simultaneous call is made across a plurality of base station devices as a single paging area, and a call accepting sequence is started between a mobile station device such as a PHS and a mobile phone and a base station device that received a response from the mobile station device.

In such a mobile body communication system, the plurality of base station devices are associated with the same number indicating the single paging area, so that the station devices are treated as constituting one paging area. In the HLR (Home Location Register) provided in the mobile body communication system, mobile station devices and the numbers are registered in association with one another. At the time of making a call, an exchange at the transmitting party or a gateway exchange device upon receiving a call from another network reads the associated number of the mobile station device as the receiving party by referring to the HLR and a simultaneous call is made in at least one base station device corresponding to the number.

Meanwhile, IP telephone adapted to VoIP (Voice Over Internet Protocol) that utilizes a protocol on an IP network such as SIP (Session Initiation Protocol) has come to receive much attention. In mobile body communication, a wireless LAN (Local Area Network) based on SIP has been tested using a PDA (Personal Digital Assistance) or a dedicated terminal as a mobile station device.

With such IP telephone, the mobile station device on the receiving side is identified by specifying the IP address by the transmitting side or if the IP address is stored in the SIP server on the Internet or the LAN in association with the telephone number or mail address, the transmitting side designates the telephone number or the mail address to read out the IP address corresponding to the telephone number by referring to the SIP server and specifies the IP address. Then, the call is received by IP routing.

Application of the above described VoIP technology to the conventional mobile body communication system described above can eliminate the need for the exchange or allows lines to be more efficiently used, which could reduce the communication cost. In addition, as a backbone IP network has been developed and the VoIP techniques have been improved, adaptation in IP of existing mobile body communication systems have been researched and developed.

In the disclosure of Patent Document 1, a voice call is converted into data packets during voice communication between a mobile body communication network connected to a commination network based on an internet protocol and a mobile station.

Patent Document 1: JP-T-2001-527337

DISCLOSURE OF THE INVENTION

Problems to be Solved by the Invention

However, VoIP does not provide a method of making a simultaneous call like the paging area providing method in the conventional mobile body communication system such as PHS, and a call is made from one base station device within the calling area of the mobile station device when radio serves as the access line. Therefore, it is difficult to apply VoIP to the kind of mobile body communication in which mobile telephone devices move in a relatively large area and highly frequently. When a mobile body communication system is adapted to operate on an IP-basis, mobile station devices used before then can no longer be used, which is not desirable in consideration of the nature of mobile body communication service. However, when VoIP is employed, mobile station devices must be adapted to VoIP.

The present invention is done in view of the above described current condition. It is an object of the invention to provide a configuration having a simultaneous call area made up of a broadcast domain including at least one base station device, so that, in the IP adapted mobile body communication system, a call receiving procedure according to the paging area providing method described above is provided, and any of the above conventional mobile body communication systems (hereinafter referred to as "existing system") and a mobile body communication system to which VoIP is applied (hereinafter referred to as "VoIP-based system") is used at the same time.

Means for Solving the Problems

In order to solve the above conventional problems, the present invention has subnet forming means for forming a broadcast domain with at least one base station device, and simultaneous call means for transmitting a call signal to the broadcast address of said subnet when making a call on a mobile station device. In this way, in the IP adapted mobile body communication system, a calling procedure according to the paging area providing method described above can be provided.

Furthermore, there may be storing means for storing a mobile station device specifying number provided to said mobile station device and an address indicating said subnet in association with each other and position registering means for storing said mobile station device specifying number and the address indicating said subnet in association with each other on said storing means. Said simultaneous call means may transmit a call signal to a broadcast address corresponding to said address indicating said subnet stored in association with said mobile station device specifying number when calling said mobile station device provided with said mobile station device specifying number. In this way, in the VoIP-based system, the transmitting side can specify the receiving side based on the mobile station device specifying number such as the telephone number.

In addition, said base station device may include protocol exchange means for exchanging a communication protocol for use in an IP network and a communication protocol for use in a radio zone with each other. In this way, the mobile station device used in any of the existing systems may be used as it is in a VoIP-based system.

Furthermore, a mobile body communication method according to an embodiment of the invention enables a programmed computer to carry out mobile body communication. Said method includes the steps of forming a broadcast domain with at least one said base station device and transmitting a call signal to the broadcast address of said subnet when making a call on a mobile station device.

Advantages of the Invention

According to the invention, in the IP-based operation of a mobile body communication system, a call receiving procedure according to the paging area providing method described above can be provided, and an existing system and a VoIP-based system can be used at the same time.

BRIEF DESCRIPTION OF THE DRAWINGS

FIG. 5 is a functional block diagram of the SIP server according to the embodiment of the invention;

FIG. 6 shows a sequence of an example of position registration according to the embodiment of the invention;

FIG. 7 shows an example of a position information table stored in the location server according to the embodiment of the invention;

Figure 1:
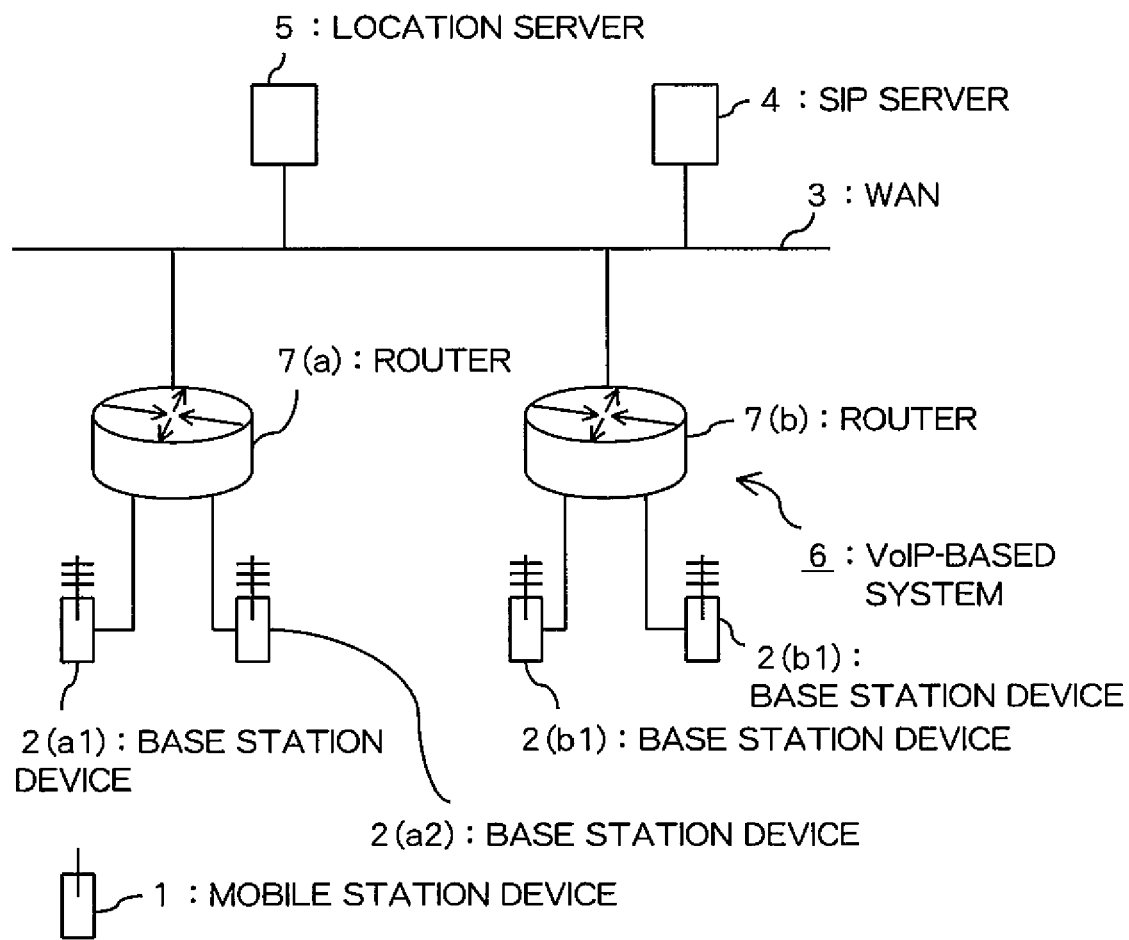
FIG. 1 shows the configuration of a VoIP-based system according to an embodiment of the invention.

DESCRIPTION OF REFERENCE CHARACTERS 1 mobile station device
2 base station device
3 WAN
4 SIP server
5 location server
6 VoIP-based system
7 router
11 communication unit
12, 23, 41 control unit
13, 24, 43 storing unit
14 operation unit
15 display unit
21 radio communication unit
22, 42 network interface unit
45 computer
46 registering unit
47 proxy unit.

BEST MODE FOR CARRYING OUT THE INVENTION

An embodiment of the invention will be described with reference to the drawings. As shown in FIG. 1, a VoIP-based system 6 according to the embodiment includes an SIP server 4, a location server 5, and routers 7 provided on a WAN (Wide Area Network) 3. At least one base station device 2 is connected to each of the routers 7 and thus connected to the WAN 3 through the router 7. The mobile station device 1 carries out radio communication with the base station device 2.

Figure 2:
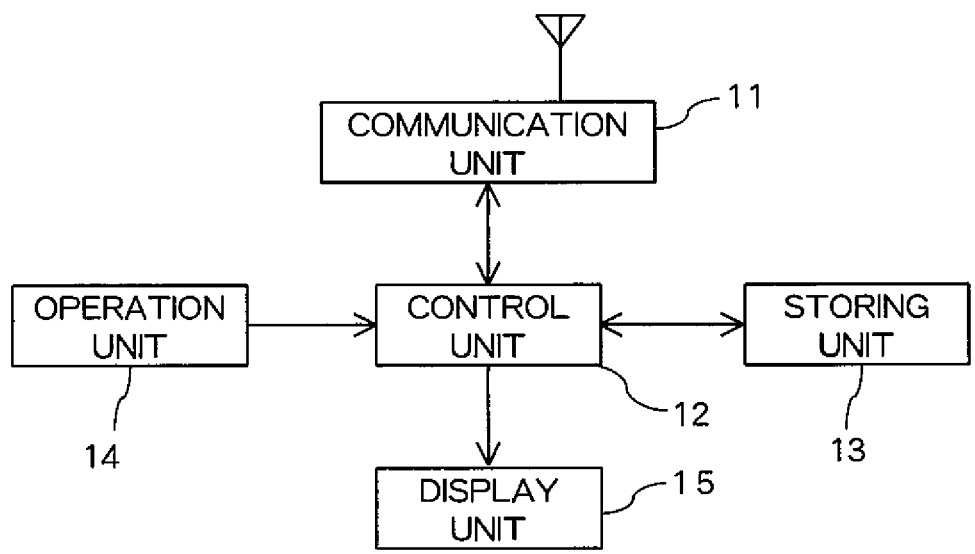
FIG. 2 is a block diagram of the configuration of a mobile station device according to the embodiment of the invention.

The mobile station device 1 is for example a known device such as a PHS terminal and a mobile phone, and includes a communication unit 11, a control unit 12, a storing unit 13, an operation unit 14, and a display unit 15 as shown in FIG. 2. The communication unit 11 has an antenna that receives an incoming signal from at least one base station device 2 and outputs the received signal to the control unit 12. The device also transmits a signal to the base station device 2 in response to an instruction from the control unit 12.

The control unit 12 controls various elements and carries out processing related to telephone conversation and data communication. The storing unit 13 operates as a work memory for the control unit 12. The storing unit 13 stores programs and parameters related to various kinds of processing carried out by the control unit 12. The operation unit 14 is for example a ten-key, and outputs a telephone number and an input character string received from the user to the control unit 12. The operation unit 14 has an off-hook button and an on-hook button, and when the user presses these buttons, the unit outputs the act of pressing as information to the control unit 12, so that the control unit 12 either starts or disconnects calling in response. The display unit 15 outputs information in response to a signal input from the control unit 12 and displays the information.

Figure 3:
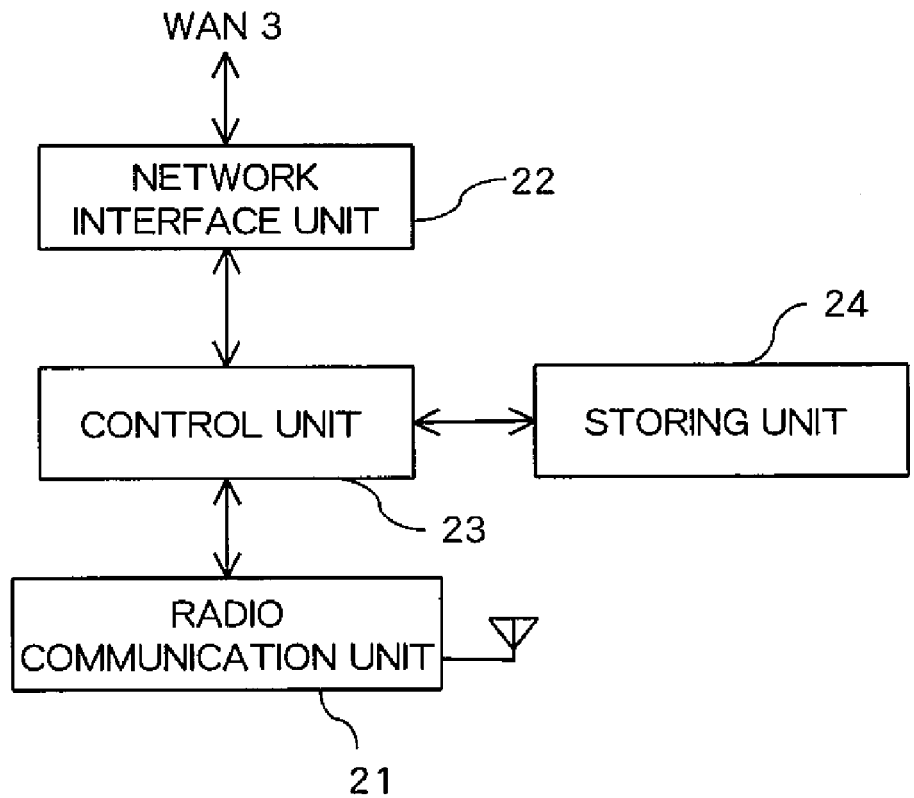
FIG. 3 is a block diagram of the configuration of a base station device according to the embodiment of the invention.

As shown in FIG. 3, the base station device 2 includes a radio communication unit 21, a network interface unit 22, a control unit 23, and a storing unit 24. The radio communication unit 21 has an antenna and transmits/receives signals to/from at least one mobile station device 1. The control unit 23 controls various elements of the base station device 2 and carries out processing related to telephone conversation and data communication. The storing unit 24 operates as a work memory for the control unit 23. The storing unit 24 stores programs and parameters related to various kinds of processing carried out by the control unit 23.

The network interface unit 22 transmits/receives signals to/from a router 3 through a communication line. The network interface unit 22 is provided with an IP address and forms a subnet with the other base station device 2 connected to the router 7. More specifically, a base station device 2($a$1) in FIG. 1 is provided with IP address 199.2.0.1, and the subnet mask is 255.255.255.0. A base station device 2($a$2) connected with a router 7($a$) with which the base station device 2($a$1) is connected is provided with IP address 199.2.0.2, and the subnet mask is 255.255.255.0. In this way, the base station devices 2($a$1) and 2($a$2) form a subnet, the network address of the subnet is 199.2.0.0, and the broadcast address is 199.2.0.255. The IP packets transmitted to the broadcast address are received by both the base station devices 2($a$1) and 2($a$2).

The base station device 2 exchanges protocols between the radio communication unit 21 and the network interface unit 22. More specifically, the radio communication unit 21 employs a conventional radio communication system used in a PHS or mobile telephone system etc., such as PHS, PDC, GSM, CDMA, IMT-2000 etc. The network interface unit 22 employs a communication system used in a LAN/WAN such as Ethernet®, an internet protocol such as TCP/IP, and a VoIP protocol represented by SIP. Therefore, the protocols are exchanged between them. More specifically, as will be described later, prescribed parameters are exchanged to exchange the protocols.

Figure 4:
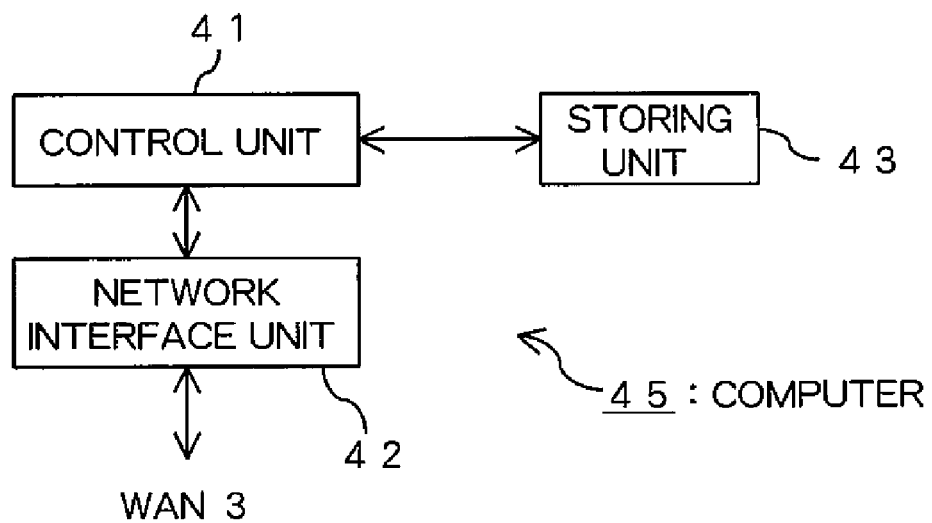
FIG. 4 is a block diagram of the configuration of an SIP server and a location server according to the embodiment of the invention.

The SIP server 4 and the location server 5 are both a conventional server computer. More specifically, as shown in FIG. 4, the servers are each made of a computer 45 including a control unit 41, a network interface unit 42, and a storing unit 43. The network interface unit 42 transmits/receives signals to/from the WAN 3 through a communication network. The network interface unit 42 is provided with an IP address.

The control unit 41 controls various elements of the computer 45 and carries out processing related to telephone conversation or data communication. The storing unit 43 operates as a work memory for the control unit 41. The storing unit 43 of the computer 45 used as the location server 5 stores various kinds of information such as telephone numbers and current location area information for use in calling processing in the VoIP-based system 6.

FIG. 5 is a functional block diagram of the SIP server 4. The SIP server 4 has a registering unit 46 and a proxy unit 47. The registering unit 46 carries out operation such as data writing and reading to/from the location server 5. The proxy unit 47 relays a conventional SIP message for use in SIP.

Figure 9:
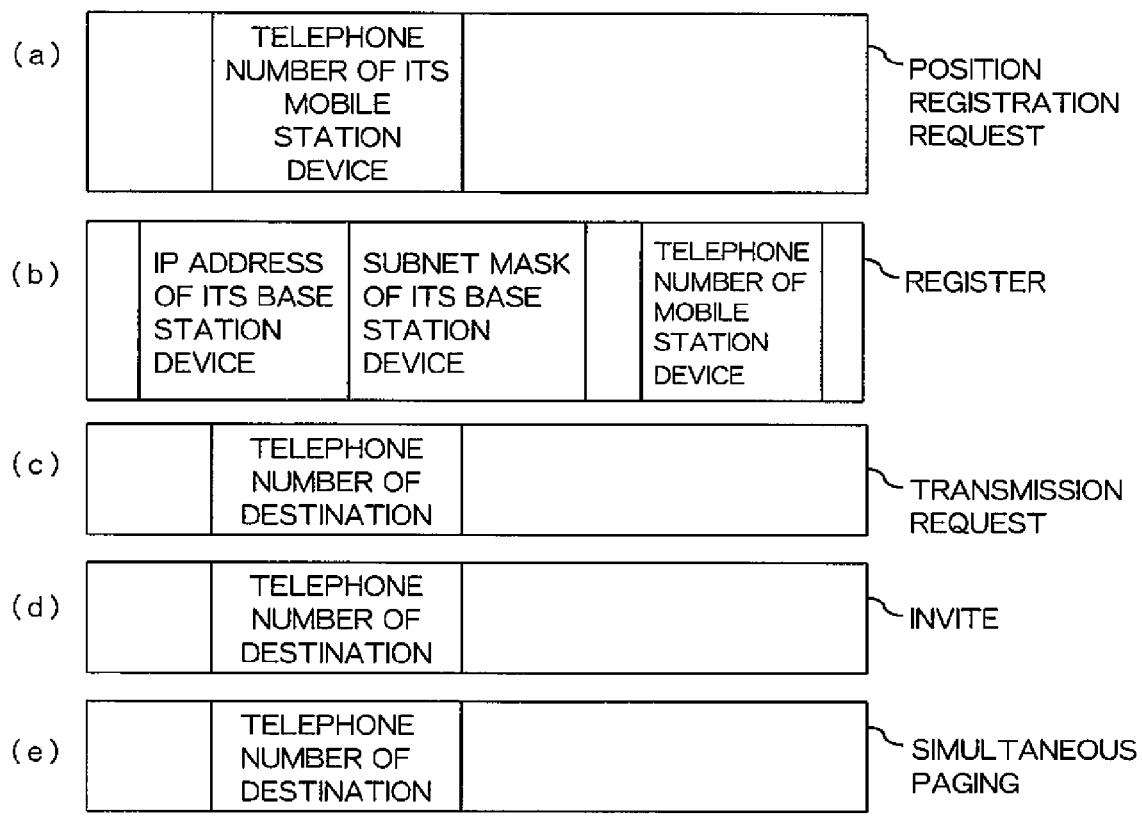
FIG. 9 shows an example of each signal format according to the embodiment of the invention.

The specific processing sequence of the position registration of a mobile station device according to the embodiment is shown in FIG. 6. In FIG. 6, the mobile station device 1 transmits a position registration request signal as shown in FIG. 9(a) to the base station device 2. The base station device 2 carries out protocol exchange by loading the telephone number of the mobile station device 1 in the received position registration request signal in a REGISTER signal shown in FIG. 9(b), and the resultant signal is transmitted to the stored IP address of the SIP server 4. Upon receiving the REGISTER signal, the SIP server 4 calculates the network address of the subnet to which the base station device 2 on the transmitting side belongs based on the IP address and the subnet mask of the base station device 2 included in the REGISTER signal, transmits the telephone number, the network address, and the subnet mask of the mobile station device 1 to the IP address of the location server 5. The location server 5 stores the received telephone number, the network address, and the subnet mask in a table as shown in FIG. 7 in which telephone numbers and the network addresses and subnet masks of subnets to which base station devices 2 belong are associated with one another. After the storing operation, the location server 5 transmits a response signal to the SIP server 4. Upon receiving the response signal, the SIP server 4 transmits a response signal to the base station device 2. Upon receiving the response signal, the base station device 2 transmits a response signal to the mobile station device 1. In this way, the location server 5 can store the paging area of the mobile station device 1.

Figure 8:
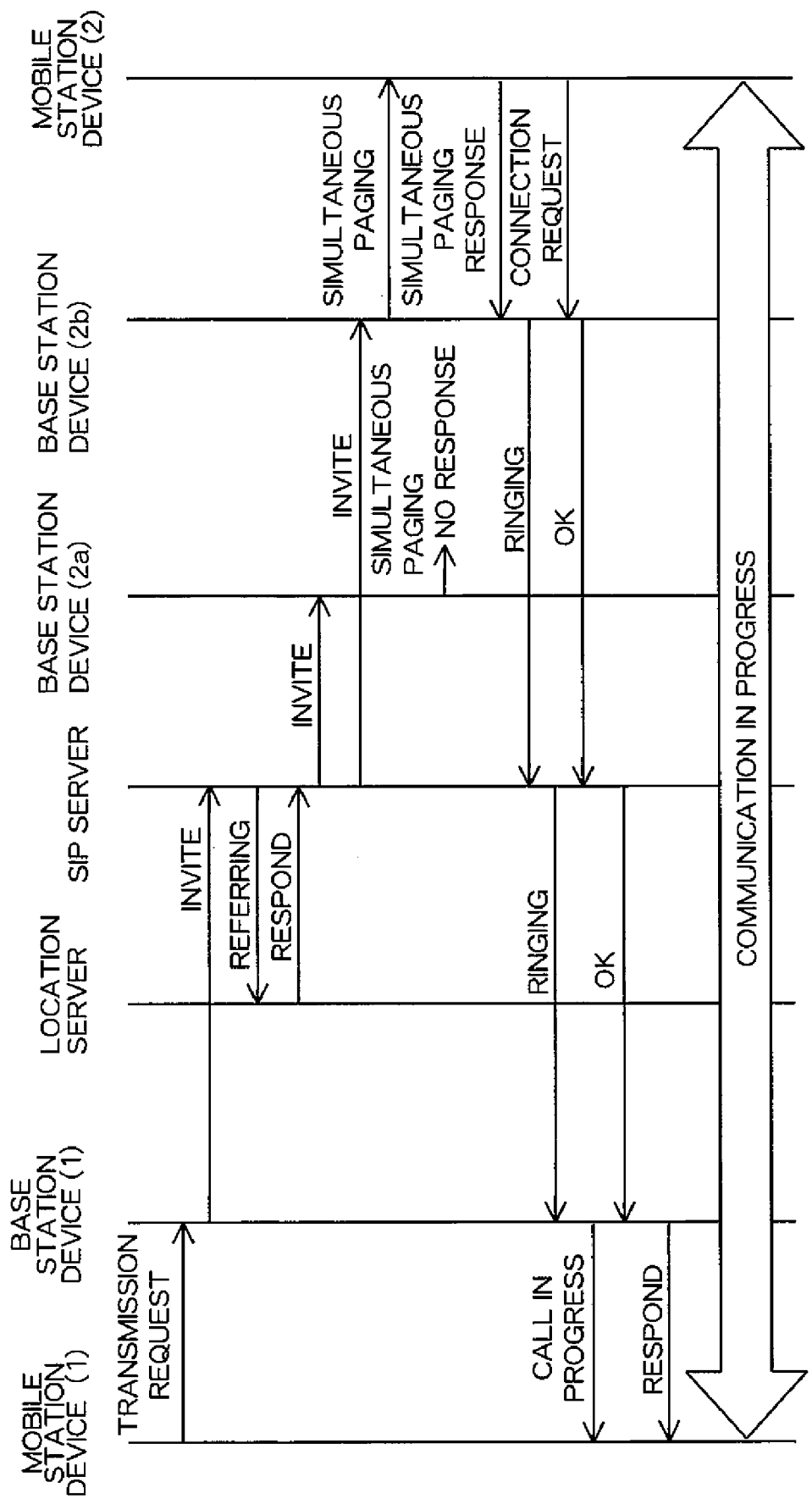
FIG. 8 shows a sequence of an example of transmission/reception according to the embodiment of the invention.

A transmission sequence by the mobile station device 1 is shown in FIG. 8. In FIG. 8, a mobile station device 1(1) transmits a transmission request signal shown in FIG. 9(c) to a base station device 2(1). The base station device 2(1) exchanges the protocols by loading the telephone number of the destination included in the received transmission request signal in an INVITE signal shown in FIG. 9(d), and transmits the signal to the IP address of the SIP server 4 stored in the storing unit 24 of the base station device 2(1). The SIP server 4 refers to the telephone number of the destination included in the INVITE signal and reads the network address and subnet mask of the subnet of the base station device 2 stored in association of the telephone number of the destination from the location server 5 if the number is a number within its network. If the number is a number from another network, the INVITE signal is transmitted to the network using a gateway exchange or a gateway router (not shown).

The SIP server 4 calculates a broadcast address based on the network address and the subnet mask read out from the location server 5, and transmits the INVITE signal to the broadcast address. In FIG. 8, the broadcast address is received by the base station devices 2 (2a) and 2 (2b). Upon receiving the broadcast address, the base station devices 2 (2a) and 2 (2b) exchange the protocols by loading the telephone number of the destination included in the received INVITE signal in a simultaneous call signal shown in FIG. 9(e) and transmits the simultaneous call signal from the radio communication unit 21.

The simultaneous call signal is received by the mobile station device 1(2), which in turn transmits a simultaneous call response signal to the base station device 2 (2b) in which the mobile station device 1(2) is currently located. Upon receiving the simultaneous call response signal, the base station device 2(b) transmits a RINGING signal to the IP address of the SIP server 4. Upon receiving the RINGING signal, the SIP server transmits the RINGING signal to the IP address of the base station device 2(1) in which the mobile station device 1(1) that has transmitted the transmission request signal is currently located. Upon receiving the RINGING signal, the base station device 2(1) transmits a call-in-progress signal instead of the RINGING signal to the mobile station device 1(1).

When the mobile station device 1(2) is off the hook, the mobile station device 1(2) transmits a connection request to the base station device 2(b), and the base station device 2(b) transmits an OK signal to the IP address of the SIP server 4. Upon receiving the OK signal, the SIP server transmits the OK signal to the IP address of the base station device 2(1) in which the mobile station device 1(1) that has transmitted the transmission request signal is currently located. Upon receiving the OK signal, the base station device 2(1) transmits a response signal instead of the RINGING signal to the mobile station device 1(1). Upon receiving the response signal, the mobile station device 1(1) starts communication with the mobile station device 1(2). In this case, VoIP-based communication is carried out between the base station devices 2(1) and 2(2). In this way, a procedure of receiving a call according to the paging area providing method is provided in the IP-based operation of the mobile body communication system, and the mobile station device 1 may be an existing PHS terminal, a mobile telephone or the like.

The invention is not limited to the above-described embodiment.

According to the embodiment, a conventional PHS terminal, mobile telephone or the like in an existing system is used as the mobile station device 1, while an IP telephone terminal can be used as well. When only the IP telephone terminals are used, the SIP protocol can be used for communication between the base station device 2 and the mobile station device 1, so that the base station device 2 does not need a protocol exchange unit to exchange the SIP protocol and the protocol used in the radio zone. VoIP-based communication can be carried out not only between the base station devices 2(1) and 2(2) but also between the mobile station devices 1(1) and 1(2). In this case, for the radio zone, a radio LAN system such as IEEE 802.11b and IEEE 802.11g may be used. When the IP address of the mobile station device on the receiving side is directly specified as the receiving side rather than the telephone number, the table in FIG. 7 does not have to be stored in the location server 5.

The storing unit 43 of the location server 5 may be included in the SIP server 4. In order to specify the mobile station device 1, any other specific number such as the mobile station device number may be used instead of the telephone number. In the table shown in FIG. 7, the network addresses and subnet masks of subnets to which base station devices 2 belong are stored, but the broadcast addresses of subnets to which the base station devices 2 belong may be stored instead. In this way, in the SIP server 4, the process of calculating the broadcast address of the subnet based on the network address and the subnet mask of the subnet to which the base station device 2 belongs is no longer necessary. Moreover, when SIP is applied to any mobile body communication systems such as PHS, PDC, GSM, CDMA, and IMT-2000, in the similar procedure, in the IP adapted mobile body communication system, it becomes possible to provide the call receiving procedure according to the paging area providing method and to use both any of the existing systems and a VoIP-based system at the same time.

The invention claimed is:

1. A mobile body communication system, comprising:
a subnet with a plurality of base station devices,
wherein one of the base station devices is configured to receive a position registration request signal transmitted from a mobile station device and to communicate with a network,
and the mobile station device is configured to communicate with a communication device via one of the base station devices and said network; and
simultaneous call means for transmitting a call signal to a broadcast address corresponding to said subnet when calling the mobile station device, and thereby transmits the signal to the plurality of base station devices;
the system further comprises:
storing means for storing a mobile station device specifying number of said mobile station device and an address of the subnet, and that the mobile station device specifying number and said subnet being in association with each other; and
position registering means operating to store said mobile station device specifying number and the address of said subnet being in association therewith on said storing means,
wherein said simultaneous call means transmits a call signal to the broadcast address corresponding to said address of said subnet stored being in association with said mobile station device specifying number when calling said mobile station device of said mobile station device specifying number.

2. The mobile body communication system according to claim 1, wherein said one base station device comprises protocol exchange means for exchanging a communication protocol for use in an IP network and a communication protocol for use in a radio zone with each other.

3. The one base station device for use in the mobile body communication system according to claim 1, comprising protocol exchange means for exchanging a communication protocol for use in an IP network and a communication protocol for use in a radio zone with each other.

4. A mobile body communication method enabling a programmed computer to carry out mobile body communication, said method comprising the steps of: forming a subnet having an address with a plurality of base station devices, wherein one of the base station devices receives a position registration request signal transmitted from a mobile station device and communicates with a network, and the mobile station device communicates with an other communication device via one of the base station devices and said network; and associating a mobile station device specifying number of the mobile station device and the address of the subnet; storing the mobile station device specifying number of the mobile station device and the address of the subnet being in association with each other upon receiving the position registration request; transmitting a call signal to the broadcast address corresponding to the address of said subnet when making a call to the mobile station device, and thereby transmitting the signal to the plurality of base station devices.

5. A mobile body communication system in which a plurality of base station devices are connected to a relay device through an IP network, comprising:
subnet forming means for providing each of the base station devices with an IP address such that a subnet is formed with at least one base station device,
wherein the relay device comprises:
position registering means for receiving a position registration request signal transmitted from a mobile station device via one of the base station devices, and for making storing means store an address indicating the subnet to which the one of the base station devices belongs, in association with a mobile station device specifying number of the mobile station device included in the position registration request signal;
reading means for receiving a call signal to the mobile station device, and for reading the address stored in association with the mobile station device specifying number included in the call signal from the storing means; and
simultaneous call means for transmitting the call signal destined for a broadcast address corresponding to the address read by the reading means, and
each of the base station devices which receive the call signal destined for the broadcast address, wirelessly transmits the call signal to the mobile station device.

6. A mobile body communication method for a mobile body communication system in which a plurality of base station devices are connected to a relay device through an IP network, the method comprising:
a step of providing each of the base station devices with an IP address such that a subnet is formed with at least one base station device;
a step in which the relay device receives a position registration request signal transmitted from a mobile station device via one of the base station devices, and makes a storing means store an address indicating the subnet to which the one of the base station devices belongs, in association with a mobile station device specifying number of the mobile station device included in the position registration request signal;
a step in which the relay device receives a call signal to the mobile station device, and reads the address stored in association with the mobile station device specifying number included in the call signal from the storing means;
a step in which the relay device transmits the call signal destined for a broadcast address corresponding to the read address; and
a step in which each of the base station devices which receive the call signal destined for the broadcast address, wirelessly transmits the call signal to the mobile station device.

* * * * *